Dec. 8, 1970 CHENG P. WEN 3,546,637

TUNABLE MICROSTRIP BAND PASS FILTER UTILIZING GYROMAGNETIC MATERIAL AT THE JUNCTION OF TWO CONDUCTIVE LOOPS

Filed July 18, 1968

INVENTOR
CHENG P. WEN
BY Simon Yaffee
ATTORNEY

United States Patent Office 3,546,637
Patented Dec. 8, 1970

3,546,637

TUNABLE MICROSTRIP BAND PASS FILTER UTILIZING GYROMAGNETIC MATERIAL AT THE JUNCTION OF TWO CONDUCTIVE LOOPS

Cheng P. Wen, Trenton, N.J., assignor to RCA Corporation, a corporation of Delaware Filed July 18, 1968, Ser. No. 745,787
Int. Cl. H01p *1/20*
U.S. Cl. 333—73 6 Claims

ABSTRACT OF THE DISCLOSURE

A simplified tunable microstrip band pass filter is disclosed which includes a pair of loops having a portion in common. A ball of ferri- or ferro-magnetic material is positioned adjacent the common portion of the loops, the common portion acting as an isolation means between the loops. The tuning of the band pass filter can be varied by varying a magnetic field which is applied to the ball.

BACKGROUND

Tunable band pass filters are known in which an input loop and an output loop are coupled by a ball of ferri- or ferro-magnetic material. Such known filters are complicated and expensive to make, and while passing the signals of the pass band frequencies with little attenuation these filters often lack isolation between the input and output loop at frequencies other than the pass band of the filter.

It is an object of this invention to provide an improved band pass filter in which the coupling element between the input and output portions thereof includes a ball of ferri- or ferro-magnetic material.

In accordance with the invention, a pair of loops are provided having a portion in common. The common portion is positioned at an angle to the remainder of the loop, the common portion having a dimension at an angle with the remainder of a loop that is greater than the cross sectional dimensions of a conductor comprising part of the loop. The two loops are formed by conductive, non-magnetic members fixed to one face of an insulator, a conductive base plate fixed to the other face of the insulator, and also a wide conductive means extending through the insulator and electrically connected to the members and to the base plate. A mass of ferri- or ferro-magnetic material, which may be in the shape of a ball is fixed to the microstrip adjacent the common portions of the input-output loops, and means for producing a magnetic field which penetrates the ball are provided.

DESCRIPTION

Figure 1:
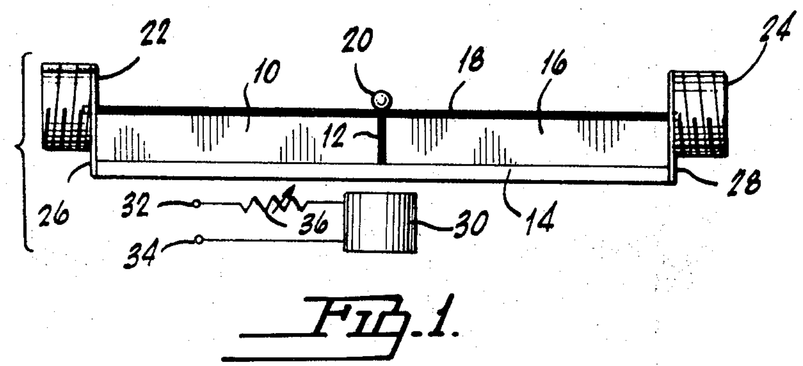
Figure 2:
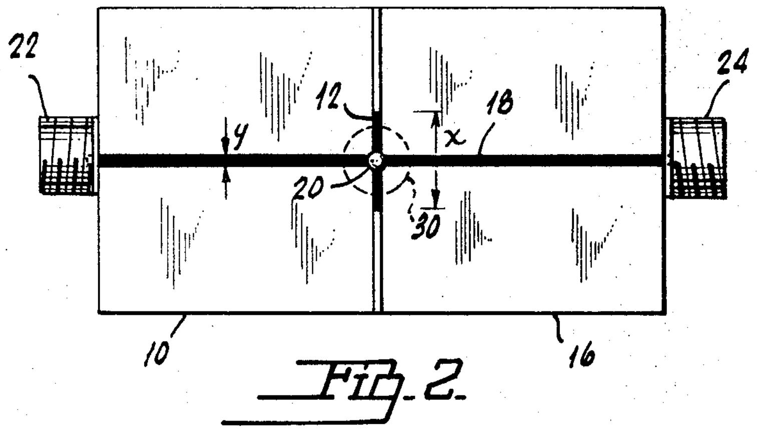

The invention may be better understood upon reading the following description in connection with the accompanying drawing in which FIG. 1 is an elevational view of a filter which includes an embodiment of this invention, and FIG. 2 is a plan view of the filter of FIG. 1.

A block 10 of low loss, insulating material which has the central portion of the edge thereof coated with non-magnetic conductive material 12 (see FIG. 2) is fixed to a non-magnetic conductive base plate 14, the material 12 being in contact with the top (as viewed in FIG. 1) of the plate 14. Another block 16 of low loss insulating material is positioned on the base plate 14 in such a manner that an edge of the block 16 contacts the material 12. A thin narrow non-magnetic conductive strip 18, which may be called a microstrip, having a width $y$, is fixed in any suitable manner to the top of both blocks 10 and 16, and is connected to the top of the coating material 12 at the center thereof. The microstrip 18 extends in a straight line across the tops of the blocks 10 and 16. A sphere or ball 20 of ferri- or ferro-magnetic material is fixed, as by an adhesive, to the top of the strip 18 just above the coating 12. The coating 12, having a width $x$, extends from the top to the bottom of the insulators 10 and 16 and the width $x$ of coating 12 is wider than the width $y$ of strip 18 but may be narrower than the blocks 10 and 16 as shown in FIG. 2. The width $x$ of the coating strip 12 perpendicular to the microstrip 18 is great enough to give good isolation between the terminal connections 22 and 24, one of which may be an input terminal connection and the other of which may be an output terminal connection. The opposite ends of the strip 18 are electrically connected to the center conductor (not shown) of the respective concentric terminal connectors 22 and 24, whose external conductors are connected to the base plate 14 by means of connectors 26 and 28. An electro-magnet 30 is so positioned that its lines of force penetrate the ball 20. The electro-magnet 30 is fed from a source (not shown) connected to the terminals 32 and 34 by way of an adjustable resistor 36 which is included in the circuit between the terminals 32 and 34 and the magnet 30.

Two loops are provided by the described structure. One loop comprises the portion of the microstrip 18 that is connected to the inner conductor of the coupling device 22, the coating 12 and the base plate 14 and back to the outer conductor of the coupling device 22. The other loop comprises the portion of the microstrip 18 that is connected to the inner conductor of the coupling device 24, the coating 12 and the base plate 14 back to the outer conductor of the coupling device 24. The two loops have the coating 12 in common, whereby, in the absence of the ball 20 and the magnet 30, the common portion 12 short-circuits the two loops and there is no coupling therebetween. Furthermore, due to the large dimensions of the coating 12 in a direction perpendicular to the microstrip 18 compared to the corresponding dimensions of the microstrip 18, there is very little inadvertent coupling between the two loops.

When the ball 20 and the magnet 30 are provided as shown and described, a coupling is provided between the two loops at a frequency dependent upon the intensity of the magnetic field applied to the ball 20 by the magnet 30. It is thought that the magnetic field in the ball 20 rotates in such a manner as to describe one or more conical surfaces and that the frequency of rotation depends on the strength of the magnetic field as is the case with gyromagnetic material, whereby the two loops are coupled due to this rotation of the magnetic field and the band pass frequency of the described filter depends on the rotation frequency. Therefore, by adjustment of the magnetic field produced by the magnet 30, as by varying the resistor 36, the pass band of the described filter will be varied. If desired, a permanent magnet may be substituted for the magnet 30.

The ball 20 may be of a ferri-magnetic material known as YIG, however it may be made of any good ferri-magnetic material. Certain ferro-magnetic materials may also be useful as the material for making the ball 20. The size of the ball 20 while not critical may be by way of example from $\frac{1}{64}$ to $\frac{1}{32}$ of an inch in diameter. Within limits, the bigger the ball 20, the greater the width of the pass band of the filter. The microstrip 18 may be about 0.001 of an inch thick and about 0.025 of an inch wide. Also, within limits, the narrower the microstrip, the wider the pass band of the filter. Therefore, by choice of the size of the ball 20 and of the width of the strip 18, the width of the pass band of the described filter may be adjusted.

What is claimed is:

1. A high frequency band pass filter comprising:

a conductive microstrip that continues from one of a pair of input terminals to one of a pair of output terminals, a first conductor connecting the other of the input terminals with the other of the output terminals, a second conductor positioned transverse to the length of said microstrip and connecting said microstrip to said first conductor at a point between the ends of said microstrip, said second conductor providing a high frequency short circuit between said microstrip and said first conductor, said short circuit being provided from the junction of said microstrip and said second conductor to said first conductor, said second conductor having a width in a direction transverse to the length of said microstrip which is greater than the width of said microstrip in said direction transverse to said length thereof, and a mass of insulating gyromagnetic material, for providing substantial energy transfer, in a predetermined range of frequencies, from said input terminals to said output terminals when said material is subjected to an applied magnetic field, said gyromagnetic material having its internal magnetic field rotated in such a manner as to describe one or more conical surfaces, the frequency of rotation thereof depending upon the strength of said applied magnetic field, said material being positioned at the junction of said microstrip and said second conductor.

2. The invention as expressed in claim 1 in which means is provided to produce a variable magnetic field which penetrates said mass of insulating gyromagnetic material, the pass band of said filter depending upon the particular strength of said variable magnetic field applied to said gyromagnetic material.

3. The invention as expressed in claim 1, in which said microstrip is fixed to one face of each of two insulating sheets, and in which said first conductor is fixed to the opposite faces of said insulating sheets, said insulating sheets having adjacent edge, said second conductor being positioned between said adjacent edges.

4. A high frequency band pass filter comprising:

a conductive, nonmagnetic base plate, a pair of insulating sheets positioned so that one face of each thereof is in contact with said base plate and selected edges of said insulating sheets are adjacent to each other.

an elongated continuous nonmagnetic microstrip fixed to the faces of said insulating sheets that are opposite the faces that are in contact with said base plate, said microstrip having small dimensions transversely to the length thereof, a nonmagnetic conductor between the adjacent edges of said insulating sheets, said conductor being electrically connected to said microstrip and to said base plate, said nonmagnetic conductor having a width, in a direction transverse to the length of said microstrip, which is greater than the width of said microstrip in said transverse direction, and a ball insulating gyromagnetic material adapted to have a magnetic field applied thereto and fixed to said microstrip at the position where said conductor is connected to said microstrip, said gyromagnetic material having its internal magnetic field rotated in such a manner as to describe one or more conical surfaces, the frequency of rotation theerof depending upon the strength of said applied magnetic field.

5. The invention as expressed in claim 4 and including means to produce a variable magnetic field which penetrates said ball.

6. The invention as expressed in claim 4 in which said nonmagnetic conductor comprises a coating on an edge of one of said insulators.

References Cited

UNITED STATES PATENTS

| | | | |
|---|---|---|---|
| 3,162,826 | 12/1964 | Engelbrecht ------- | 333—24.2X |
| 3,289,112 | 11/1966 | Brown ------------ | 333—24.2 |

OTHER REFERENCES

Bonfeld et al.: A Novel Strip-Line Circulator IEEE Trans. on MTT, February 1966, pp. 98, 99.

A. J. Marriage et al.: Some Non-Reciprocal Coaxial Devices at 2 gc./s. The IEE, Paper No. 3661, January 1962, pp. 147, 148 relied on.

PAUL L. GENSLER, Primary Examiner

U.S. Cl. X.R.

333—84